United States Patent
Gong et al.

(10) Patent No.: US 8,322,960 B2
(45) Date of Patent: Dec. 4, 2012

(54) THREADED CONCRETE ANCHOR

(75) Inventors: Yongping Gong, Glenview, IL (US);
Cheryl L. Panasik, Elburn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 156 days.

(21) Appl. No.: 12/498,191

(22) Filed: Jul. 6, 2009

(65) Prior Publication Data
US 2011/0002753 A1    Jan. 6, 2011

(51) Int. Cl.
*F16B 36/04* (2006.01)
(52) U.S. Cl. ..................... 411/411; 411/387.5
(58) Field of Classification Search .......... 411/412, 411/414, 387.5, 411, 417
See application file for complete search history.

(56) References Cited

U.S. PATENT DOCUMENTS

| | | | | |
|---|---|---|---|---|
| 3,937,119 A * | 2/1976 | Ernst | | 411/422 |
| 4,637,767 A * | 1/1987 | Yaotani et al. | | 411/411 |
| 4,906,206 A | 3/1990 | Micco et al. | | |
| 5,141,376 A * | 8/1992 | Williams et al. | | 411/387.4 |
| 5,226,890 A | 7/1993 | Ianniruberto et al. | | |
| 5,891,145 A | 4/1999 | Morrison et al. | | |
| 6,250,866 B1 * | 6/2001 | Devine | | 411/387.4 |
| 6,899,500 B2 | 5/2005 | LeVey et al. | | |
| 6,956,181 B2 | 10/2005 | LeVey et al. | | |
| 6,957,557 B2 | 10/2005 | LeVey | | |
| 6,974,289 B2 | 12/2005 | Levey et al. | | |
| 7,076,989 B2 | 7/2006 | LeVey | | |
| 7,101,134 B2 * | 9/2006 | LeVey et al. | | 411/411 |
| 7,156,600 B2 * | 1/2007 | Panasik et al. | | 411/411 |
| 7,458,759 B2 | 12/2008 | LeVey | | |
| 2007/0036634 A1 * | 2/2007 | Lung | | 411/412 |
| 2007/0297873 A1 * | 12/2007 | Wieser et al. | | 411/411 |
| 2009/0169334 A1 * | 7/2009 | Su | | 411/412 |

OTHER PUBLICATIONS

International Search Report and Written Opinion of the International Searching Authority issued on Jul. 26, 2010 in connection with PCT/US2010/036635.

* cited by examiner

*Primary Examiner* — Gary Estremsky
(74) *Attorney, Agent, or Firm* — Levenfeld Pearlstein, LLC

(57) ABSTRACT

A fastener for use in concrete includes a shank and a head. The shank has a tip distal most from the head. The shank includes a first helical thread formation having a thread form thereon formed from two portions disposed upon opposite lateral sides of the thread form. The thread form has a root and the two portions include an alternating series of lobe members and base portions. The lobe members have a height as measured from the root and the base portions have a height as measured from the root. The height of the lobe members is greater than the height of the base portions and the height of the base portions is greater than zero. The fastener includes a second helical thread formation that is disposed adjacent to and spaced from the first helical thread formation.

12 Claims, 2 Drawing Sheets

THREADED CONCRETE ANCHOR

BACKGROUND OF THE INVENTION

The present invention relates generally to concrete anchors. More particularly, the present invention relates to an improved one piece threaded anchor for use in concrete.

Concrete anchors are well known in the art. One type of anchor is a screw anchor. Such an anchor has a shank with an external thread. The anchor is threaded into an opening or bore drilled into the concrete. The threads engage the wall of the opening and hold the anchor in the concrete. The holding strength (also referred to as resistance to pull out), depends upon the engagement of the threads with the concrete.

Another type of anchor is a multi-piece anchor that includes a bolt or like element (having a shank) with a diverging (shaped) end and a sleeve or wedge elements with a shape complementary to the anchor end. The sleeve or wedges expand outward to engage the inside of the opening as they are urged outward by the complementary shaped elements.

Screw anchors serve their function well, however, when the concrete around the screw anchor is cracked, problems arise with respect to meeting pullout requirements. As for the multi-piece anchor systems, these function well, however, they are significantly more complex and costly compared to screw type anchors and installation is more labor intensive.

Accordingly, there is a need for a concrete anchor that is readily installed and can meet today's pullout requirements. Desirably, such a fastener is a one-piece fastener and functions well and meet requirements even installed in concrete with a crack in-line with the fastener body.

BRIEF SUMMARY OF THE INVENTION

A fastener for use in concrete includes a shank and a head. The shank has a tip distal most from the head. The shank includes a first helical thread formation having a thread form thereon formed from two portions disposed upon opposite lateral sides of the thread form.

The thread form has a root and the two portions include an alternating series of lobe members and base portions. The lobe members and base portions each have a height as measured from the root. The height of the lobe members is greater than the height of the base portions and the height of the base portions is greater than zero. The shank includes a second helical thread formation disposed adjacent to and spaced from the first helical thread formation. The second helical thread formation has a height that is less than the height of the lobe members.

In a present fastener the height of the lobe members measured from the root is about 0.040 inches to about 0.180 inches and the first helical thread form has a pitch distance of about 0.175 inches to about 0.390 inches. The second helical thread form has a pitch distance of about 0.175 inches to about 0.390 inches. Preferably the first and second helical thread forms have equal pitch distances.

A present fastener has a length that is greater than or equal to about 1.5 inches and the first helical thread form has an outside diameter that is greater than or equal to about 0.187 inches.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
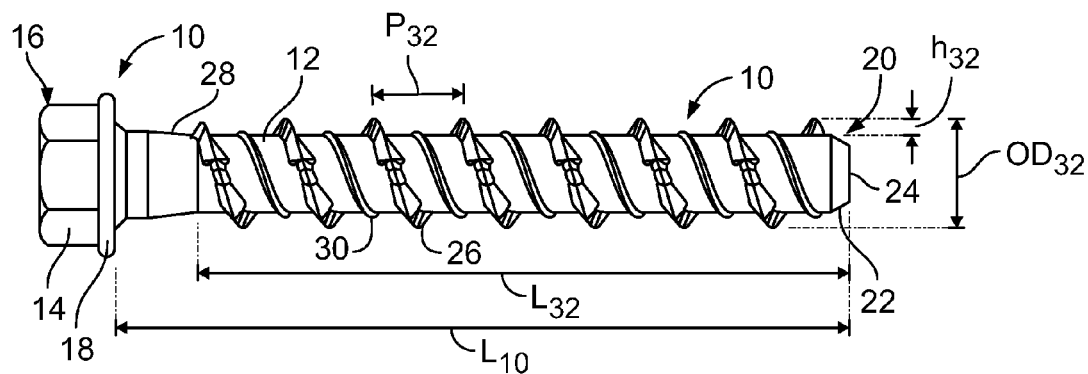
FIG. 1 is a plan view of a threaded concrete anchor embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown a threaded concrete anchor 10 embodying the principles of the present invention. The anchor includes generally a shank 12 and a head 14. The illustrated anchor head 14 includes a hexagonal driver engagement portion 16 contiguous with an intermediate washer portion 18. It will, however, be appreciated that many different types of driver engagement portions can be used, which driver portions will be recognized by those skilled in the art.

The shank 12 is formed with a tip 20 having a bevel 22 and a flat 24 at the end thereof A first helical thread formation 26 is provided on the shank 12 from about the tip 20 to a transition region 28 spaced from the integral washer 18. A second lower height helical thread 30 is formed (preferably about equidistant) between the first threads 26, as it winds about the shank 12.

Figure 3:
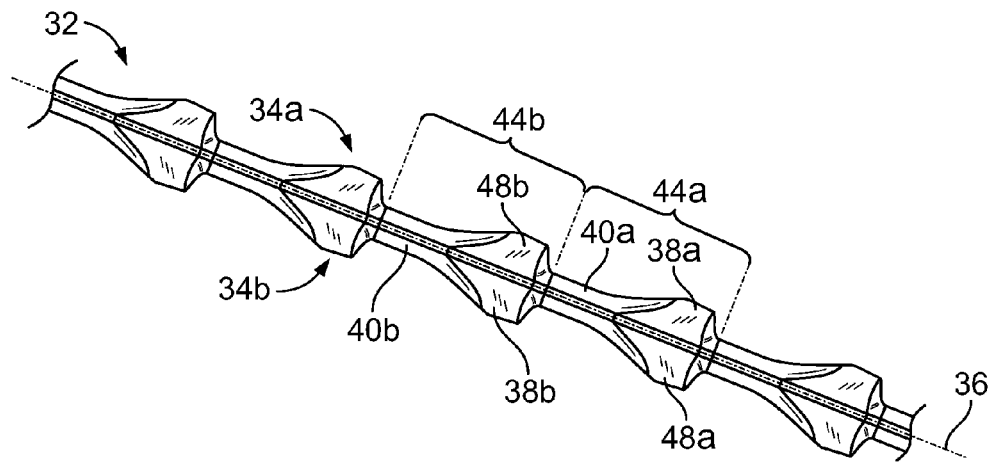
FIG. 3 is a top plan view of the thread form as shown in FIG. 2.

The present anchor 10 has been configured to reduce driving or installation torque which in turn permits the anchor 10 to be driven deeper. The present anchor 10 has also been configured to better hold (i.e., exhibit increased resistance to pull out), compared to know threaded anchors, when threaded into concrete. Accordingly, the heights and widths of various portions of the thread form 32 and the rate of change of the heights and widths of these portions are varied. More particularly, in the present embodiment, the thread form 32 is formed from two symmetrical portions 34a,b which are disposed upon opposite lateral sides of the thread form 32, as viewed along the longitudinal extent (e.g., along the line indicated at 36) of the thread form, as best seen in FIG. 3. Alternatively, although not shown, the thread form can be non-symmetrical.

The thread form 32 comprises an alternating series of boss or lobe members 38, and base portions 40. The boss or lobe members 38 effectively extend laterally outwardly and upwardly with respect to the base portions 40. The base portions 40 serve as longitudinally extending rib members for strengthening the thread form (as defined by the series of boss or lobe members 38), and do not substantially interact with the concrete as the fastener 10 is threaded into the concrete.

Figure 2:
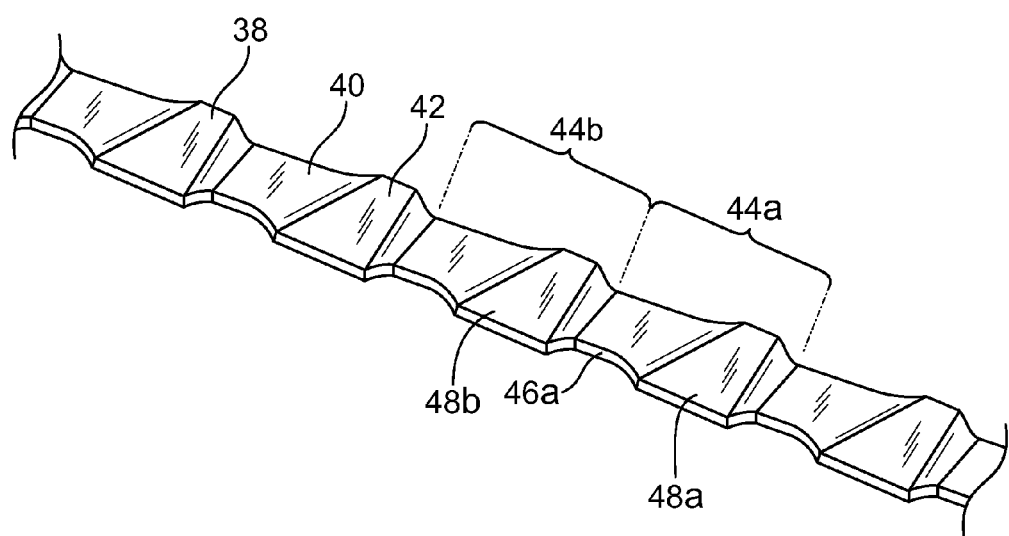
FIG. 2 is a perspective view of a thread form showing the relative heights and widths of various portions of the thread.

Referring to FIGS. 2 and 3, it is seen that each boss or lobe member 38 has a corresponding base portion 40, and that each boss or lobe member 38 and each base portion 40, defines a crest portion 42. As best seen in FIGS. 2 and 3, the paired combination of each boss or lobe member 38 and its corresponding base portion 40 together define a thread unit 44 which has, for example, a first end portion 46 and a second end portion 48. In a unit 44a, the first end portion 46a of the thread unit 44a, which includes a particular boss or lobe member 38a and its corresponding base portion 40a, shares or defines an interface with the second end portion 48b of an adjacent thread unit 44b. As can best be seen from FIG. 3, each one of the thread units 44 has an arrowhead-like configuration. Other profiles or configurations are anticipated.

The 10 anchor can be manufactured so that the lead form 32 extends helically around the shank 14 portion with the first end portions 46 oriented toward the tip 20 of the anchor 10, which exhibits desirable insertion characteristics with respect to certain substrate materials, such as, concrete. An example of such a thread configuration is illustrated in LeVey et al, U.S. Pat. No. 6,899,500 and Panasik et al., U.S. Pat. No. 7,156,600, both of are commonly assigned with the present application and both of which are incorporated herein by reference.

In a present anchor 10, the thread height $h_{32}$, which is measured to the crest 42 at a lobe 38, is about 0.040 inches to about 0.180 inches, the pitch distance $p_{32}$ is about 0.175 inches to about 0.390 inches, the thread length $l_{32}$ is greater than or equal to about 0.75 inches, the anchor length $l_{10}$ is greater than or equal to about 1.5 inches and the thread outside diameter $OD_{32}$ is greater than or equal to about 0.187 inches.

In a preferred anchor, the thread height $h_{32}$ is about 0.050 inches, the pitch distance $p_{32}$ is about 0.296 inches, the thread length 132 is about 2.0 inches, the anchor length $l_{10}$ is about 2.5 inches and the thread outside diameter $OD_{32}$ is about 0.003 inches.

Tests were conducted to determine the loads at failure (pullout) of the present anchor 10 installed in cracked concrete. The anchor 10 tested was a 5/16 inch anchor installed in an hole (bore) formed using a 1/4 inch drill bit, to a depth of 2 1/4 (two and one-quarter) inches. The anchor 10 was installed in the opening having a crack width (avg.) of 0.012 inches. Loads tested were varied, as noted below in Table 1. The concrete strength was determined to be 2932 pounds per square inch (psi).

TABLE 1

ANCHOR FAILURE TEST AT LOAD IN CRACKED CONCRETE

| Spec. No. | Avg. crack width, initial | Avg. crack width final | Init load (lbs) | Test time (sec) | Ultimate load (lbs) | Displ @ult. load (In) | Failure mode | Ult. load adjusted to 2500 psi |
|---|---|---|---|---|---|---|---|---|
| 1 | 0.012 | 0.012 | 171 | 66 | 2585 | 0.028 | Surf cone | 2387 |
| 2 | 0.012 | 0.013 | 123 | 51 | 1915 | 0.028 | Surf cone | 1768 |
| 3 | 0.012 | 0.012 | 83 | 53 | 1828 | 0.038 | Surf cone | 1688 |
| 4 | 0.012 | 0.012 | 100 | 61 | 2238 | 0.032 | Surf cone | 2067 |
| 5 | 0.012 | 0.012 | 99 | 79 | 2500 | 0.032 | Surf cone | 2308 |
| 6 | 0.012 | 0.012 | 81 | 57 | 2368 | 0.040 | Surf cone | 2187 |
| Avg. | | | | | 2239 | 0.033 | | 2067 |

In each of the above-noted test samples, failure mode was the formation of a surface cone which is characterized by a cone shaped spall that forms from the base of the anchor to the surface of the concrete. The ultimate load on the anchor and the displacement of the anchor at failure is shown in Table 1 above, with the ultimate load adjusted to a normalized load of 2500 psi.

Figure 4:
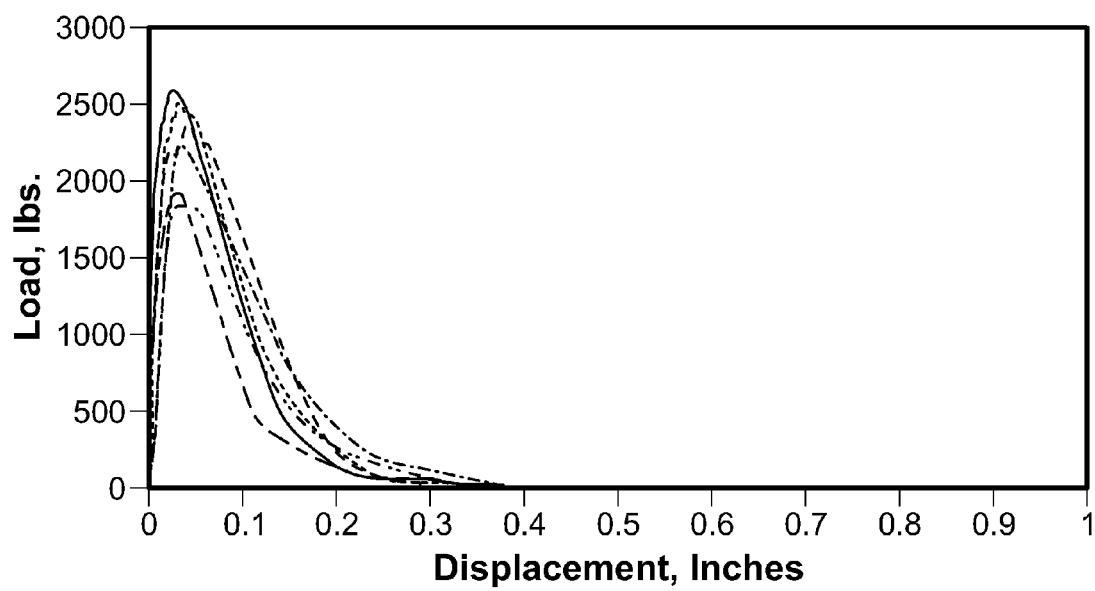
FIG. 4 is a graphical representation of the load vs. displacement results shown in Table 1.

It can be seen from the graphical representation of the results in FIG. 4 that there is an instantaneous, but short anchor displacement (which corresponds to the initial load exertion on the anchor) after which displacement drops off significantly, illustrating successful resistance to pullout (e.g., the lack of failure) of the anchor. It is believed that the increased resistance to pullout is due to a combination of factors, including but not limited to the thread form and shape, thread height, thread pitch, thread length, both absolute and relative to the anchor length and the outside diameter of the thread.

It has been found that the present anchor 10 provides high resistance to pull out, even in cracked concrete. This is a characteristic that has not been observed with known one-piece concrete anchors. At the same time, the present anchor 10 has been found to be less costly than known wedge-type anchors (which also exhibit good pull out resistance in cracked concrete). The present anchor 10 also has reduced installation torque which permits the anchor to be installed deeper than other screw type anchors which further enhances resistance to pull out in cracked concrete conditions. Moreover, the present anchor 10 is easier and faster to install which results in reduced labors costs as well.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fastener for use in concrete comprising:
   a shank; and
   a head,
   wherein the shank has a tip distal most from the head, the shank including a first helical thread formation having a thread form thereon formed from two portions disposed upon opposite lateral sides of the thread form, the thread form having a root, the two portions including an alternating series of lobe members and base portions, the lobe members and base portions each having a height as measured from the root, the height of the lobe members being greater than the height of the base portions, the height of the base portions being greater than zero, the shank including a single second helical thread formation equally spaced between the first helical thread formation as the first helical thread formation traverses the shaft,
   wherein the first helical thread formation extends from about the tip substantially the entire length of the shank, and
   wherein the thread form has an arrowhead like shape.

2. The fastener in accordance with claim 1 wherein height of the lobe members measured from the root is about 0.040 inches to about 0.180 inches.

3. The fastener in accordance with claim 1 wherein the first helical thread form has a pitch distance of about 0.175 inches to about 0.390 inches.

4. The fastener in accordance with claim 1 wherein the second helical thread form has a pitch distance of about 0.175 inches to about 0.390 inches.

5. The fastener in accordance with claim 3 wherein the second helical thread form has a pitch distance of about 0.175 inches to about 0.390 inches.

6. The fastener in accordance with claim 5 wherein the first and second helical thread forms have equal pitch distances and wherein the pitch distances are about 0.175 inches to about 0.390 inches.

7. The fastener in accordance with claim 1 wherein the fastener has a length that is greater than or equal to about 1.5 inches.

8. The fastener in accordance with claim 1 wherein the first helical thread form has an outside diameter that is greater than or equal to about 0.187 inches.

9. A fastener comprising:
a shank; and
a head,
wherein the shank has a tip distal most from the head, the shank including a first helical thread formation having a thread form thereon formed from two portions disposed upon opposite lateral sides of the thread form, the thread form having a root, the two portions including an alternating series of lobe members and base portions, the lobe members and base portions each having a height as measured from the root, the height of the lobe members being greater than the height of the base portions, the height of the base portions being greater than zero, the shank including a single second helical thread formation equally spaced between the first helical thread formation as the first helical thread formation traverses the shaft, and wherein a height of the lobe members measured from the root is about 0.040 inches to about 0.180 inches, and the first and second helical thread forms each have a pitch distance of about 0.175 inches to about 0.390 inches,
wherein the first thread extends from about the tip substantially the entire length of the shank, and
wherein the thread form has an arrowhead like shape.

10. The fastener in accordance with claim 9 wherein the first and second helical thread forms have equal pitch distances.

11. The fastener in accordance with claim 9 wherein the fastener has a length that is greater than or equal to about 1.5 inches.

12. The fastener in accordance with claim 9 wherein the first helical thread form has an outside diameter that is greater than or equal to about 0.187 inches.

* * * * *